US011066313B1

(12) United States Patent
Djukanovic et al.

(10) Patent No.: US 11,066,313 B1
(45) Date of Patent: Jul. 20, 2021

(54) METHODS FOR REMOVING ANIONS FROM WATER

(71) Applicant: CHEMTREAT, INC., Glen Allen, VA (US)

(72) Inventors: Vladimir Djukanovic, Glen Allen, VA (US); Nicholas Seymour, Williamsburg, VA (US); William Henderson, Ashland, VA (US); Oleh Weres, Reno, NV (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 16/961,829

(22) PCT Filed: Feb. 3, 2020

(86) PCT No.: PCT/US2020/016401
§ 371 (c)(1),
(2) Date: Jul. 13, 2020

(87) PCT Pub. No.: WO2020/160539
PCT Pub. Date: Aug. 6, 2020

Related U.S. Application Data

(60) Provisional application No. 62/799,968, filed on Feb. 1, 2019.

(51) Int. Cl.
C02F 1/52 (2006.01)
C02F 1/28 (2006.01)
B01J 20/02 (2006.01)
C02F 1/62 (2006.01)
C02F 1/66 (2006.01)
C02F 1/68 (2006.01)
B01J 8/00 (2006.01)
B01D 15/00 (2006.01)
C01G 3/00 (2006.01)
C01G 9/00 (2006.01)
C01G 13/00 (2006.01)
C01G 19/00 (2006.01)
C01G 49/00 (2006.01)
C02F 101/10 (2006.01)
C02F 103/10 (2006.01)
C02F 103/36 (2006.01)

(52) U.S. Cl.
CPC ......... *C02F 1/5245* (2013.01); *B01J 20/0229* (2013.01); *B01J 20/0248* (2013.01); *B01J 20/0251* (2013.01); *C02F 1/281* (2013.01); *C02F 1/62* (2013.01); *C02F 1/66* (2013.01); *B01D 15/00* (2013.01); *B01J 8/00* (2013.01); *C01G 3/00* (2013.01); *C01G 9/00* (2013.01); *C01G 13/00* (2013.01); *C01G 19/00* (2013.01); *C01G 49/00* (2013.01); *C02F 1/68* (2013.01); *C02F 2101/101* (2013.01); *C02F 2101/106* (2013.01); *C02F 2103/10* (2013.01); *C02F 2103/365* (2013.01); *C02F 2301/08* (2013.01)

(58) Field of Classification Search
None
See application file for complete search history.

(56) References Cited

U.S. PATENT DOCUMENTS

| 5,510,040 | A | * | 4/1996 | Miller | C02F 1/54 210/721 |
| 7,501,065 | B1 | * | 3/2009 | Bader | B01D 61/027 210/652 |
| 8,545,673 | B2 | | 10/2013 | Dietz et al. | |
| 9,963,360 | B2 | | 5/2018 | Kratochvil et al. | |
| 2014/0301918 | A1 | * | 10/2014 | Lagno Sanchez | C22B 34/34 423/54 |
| 2017/0190600 | A1 | | 7/2017 | Venkateshwar et al. | |
| 2017/0334746 | A1 | | 11/2017 | Patwardhan et al. | |

FOREIGN PATENT DOCUMENTS

EP 0 807 457 A1 11/1997

OTHER PUBLICATIONS

Apr. 24, 2020 International Search Report issued in International Patent Application No. PCT/US2020/016401.
Apr. 24, 2020 Written Opinion issued in International Application No. PCT/US2020/016401.
Stefansson, A., "Iron(III) Hydrolysis and Solubility at 25° C.", Environ. Sci. Technol., vol. 41, (2007), pp. 6117-6123.

* cited by examiner

*Primary Examiner* — Clare M Perrin
(74) *Attorney, Agent, or Firm* — Oliff PLC

(57) ABSTRACT

Methods are disclosed for treating water containing a target anion to remove the target anion. The methods can include preparing a treatment composition solution that contains a metal treatment agent, adjusting the treatment composition solution to a first pH that is alkaline and then to a second pH that is acidic, and contacting the treatment composition solution with the water that contains the target anion.

21 Claims, No Drawings

METHODS FOR REMOVING ANIONS FROM WATER

BACKGROUND

The purification of water to remove toxic and/or unwanted anions is important for many applications, such as the treatment of feeds, waste streams, process streams and by-products associated with various industrial processes, the provision of safe potable drinking water, and the treatment and control of municipal waste water. Known methods for purifying aqueous solutions include reverse osmosis, distillation, ion-exchange, chemical adsorption, coagulation, flocculation, and filtering or retention.

In particular, the presence of various compound forms of selenium in water is of great environmental concern as selenium-containing compounds can be extremely toxic. Additionally, regulatory agencies have placed strict guidelines on discharging selenium to the environment. In particular, facilities that generate selenium are restricted to 12 parts per billion (ppb) discharge limits and in many cases must treat to less than 5 ppb. It has proven particularly difficult to remove selenate anion ($SeO_4^{2-}$) from water. For example, chemical coagulants such as ferric oxide can effectively remove selenite when fed in excess, but show little efficacy for removing selenate. Activated alumina has also been shown to be an effective media for removing selenite, but gives poor results for selenate removal. While biological reactors have been shown to remove both selenite and selenate by reduction to elemental selenium, these systems cost around $30 million to treat 300-400 gpm (gallon per minute) of water. Additionally, microbiological upsets can occur causing selenium levels to spike. As a result, many advanced fluid purification technologies have had limited application with respect to removal and collection of selenate from waters and other aqueous solutions.

There remains a need for improved removal methods (in terms of: cost, simplicity, reliability, efficiency and selectivity) for removal of unwanted anions from water.

SUMMARY

In one aspect, this disclosure provides a method of treating water that contains a target anion, including the steps of preparing a treatment composition solution containing a metal treatment agent, setting the pH of the treatment composition solution to a first pH that is greater than 7.5, and then adjusting the pH of the treatment composition solution to a second pH that is less than 4.5, and contacting the treatment composition solution with the water that contains the target anion such that the target anion precipitates.

In another aspect, this disclosure provides a method of treating water that contains selenate, including the steps of preparing a treatment composition solution containing a metal treatment agent, setting the pH of the treatment composition solution to a first pH that is in a range of from 8 to 10, and then adjusting the pH of the treatment composition solution to a second pH that is in a range of from 2 to 6, and contacting the treatment composition solution with the water that contains selenate, where the metal treatment agent reduces less than 5 wt. % of the selenate.

In another aspect, this disclosure provides a method of treating water that contains a multivalent target anion. The method includes providing a treatment composition solution containing a metal treatment agent that is a soluble salt of a multivalent cation, controlling the pH of the treatment composition solution so that the pH is alkaline and so that at least 80 wt. % of the metal treatment agent precipitates, and then controlling the pH of the treatment composition solution so that the pH is acidic, so that the precipitated metal treatment agent becomes sufficiently positively charged that the treatment composition solution exhibits a positive measured colloidal surface charge as measured by a Mütek™ PCD-04 Particle Charge Detector, and so that at least 80 wt. % of the metal treatment agent is maintained as a precipitate. The treatment composition solution is contacted with the water that contains the multivalent target anion, and the multivalent target anion adsorbs onto the positively charged precipitated metal treatment agent.

DETAILED DESCRIPTION OF EMBODIMENTS

In the following description, numerous details are set forth to provide an understanding of the present disclosure. However, it may be understood by those skilled in the art that the methods of the present disclosure may be practiced without these details and that numerous variations or modifications from the described embodiments may be possible.

It was surprisingly discovered in connection with some aspects of the present invention that the efficacy of anion removal in water can be improved by controlling the pH of a treatment composition. In this regard, embodiments of the invention provide a method for removal of a target anion by preparing a treatment composition solution that contains a metal treatment agent, and setting the pH of the treatment composition solution to at first pH above 7.5, and then adjusting the pH of the treatment composition solution to a second pH that is acidic. The treatment composition solution can be contacted with water that contains the target anion to precipitate and/or adsorb the target anion and allow for its removal. The precipitated/adsorbed anion can then be separated from the water by chemical and/or physical separation techniques.

The pH of the treatment composition solution can be controlled to be within the first and second pH ranges either before or after coming into contact with the target anion-containing water. In this regard, in some embodiments, the method can include preparing the treatment composition solution (e.g., by adding the metal treatment agent to a fluid), then controlling the pH of the treatment composition solution to the first pH above 7.5, then adjusting the treatment composition solution to the second pH, which is acidic, and then adding the treatment composition solution to the target anion-containing water. In other embodiments, the method can include adding the metal treatment agent of the treatment composition directly to the target anion-containing water to create the treatment composition solution in situ, and then controlling the pH of the treatment composition solution (which includes the target anion) to reach the first pH above 7.5, and then adjusting the pH of the solution to the second pH. In yet other embodiments, the method can include preparing the treatment composition solution (e.g., by adding the metal treatment agent to a fluid), then controlling the pH of the treatment composition solution to reach the first pH above 7.5, then adding the treatment composition solution to the target anion-containing water, and then adjusting the pH of the solution (which includes the target anion) to the second pH.

The first pH can be alkaline such as above 7.5, or in the range of from 7.5 to 12, from 8 to 10, from 8.5 to 9.5, or from 9 to 9.5. The treatment composition solution can be set to the first pH by preparing the treatment composition solution to be at the first pH or by adjusting the pH of the treatment composition solution by adding pH adjusting agents. For example, it may be necessary to increase the pH of the treatment composition solution to reach the first pH, in which case, pH adjusting agents such as sodium hydroxide or borate can be added to raise the pH.

The second pH can be acidic such as in the range from 6.5 or lower, from 2 to 6, from 3 to 5.5, from 3 to 4.9, or from 3.5 to 4.5. The treatment composition can reach the second pH by adding pH adjusting agents such as hydrochloric acid, sulfuric acid, etc.

It was surprisingly discovered that controlling the pH of the treatment composition to be at least two discrete pH values or ranges improves the efficacy of the metal treatment agent in removing unwanted anions from water. Without intending to be bound by theory, it is believed that this process occurs through an adsorption mechanism. At alkaline pH, e.g., between 7.5-10, at least some of the metal of the treatment composition will precipitate and the precipitate may exist in a particular form that is transient. For example, in the case of iron salts, it is believed the alkaline pH converts the iron to an insoluble form of iron (III).

Accordingly, in some aspects, the alkaline pH can be selected and controlled (e.g., by adding sufficient alkali) so that a sufficient amount of the metal treatment agent precipitates, e.g., so that at least 80 wt. %, or at least 90 wt. %, or at least 95 wt. %, or at least 99 wt. % of the metal treatment agent in the treatment solution precipitates in slurry form. The acidic pH can also be controlled to be above a level that would cause significant amounts of the metal treatment agent to redissolve or dehydrate and crystallize, which could degrade its ability to adsorb anions. The specific preferred alkaline or acidic pH may depend on the metal treatment agent that is used.

Over time, it is believed the transient metal species may slowly convert to other species, which are less effective at removing the target anion. For example, in the case of iron salts, the transient species may convert to goethite over time.

But, despite a desired species of metal being formed at alkaline pH, the metal is not effective at removing anions at higher pH. The pH must be acidic, e.g., pH 2.5-5.0, in order to effectively remove the anion, perhaps because it protonates the anion and forms an anion that is more readily adsorbed by the metal species. During the drop in pH, there is some reversion, and the transient metal species and other species may be in equilibrium, which allows the protonated anion to associate with the more effective metal species.

Without intending to be bound by theory, a further explanation of the possible mechanism is that the metal treatment agent precipitates as a metal oxide and/or metal hydroxide, and that the drop in pH may strip some of the anions from the metal treatment agent off of the precipitate making it positively charged, e.g., in the case of ferric hydroxide the drop in pH may strip some of the hydroxide ions off of the precipitate. The resulting precipitate is fine grained and positively charged, which becomes effective at adsorbing the target anion. This phenomena can be explained in some respects by the solubility of ferric as a function of pH, which is described in Stefánsson, "Iron(III) Hydrolysis and Solubility at 25° C.," Environ. Sci. Technol., v. 41, pp. 6117-6123 (2007).

Accordingly, in some aspects, the acidic pH can be controlled so that it is low enough to induce a sufficient positive charge on the particles in the slurry so that the treatment composition solution exhibits a positive measured colloidal surface charge as measured by Mütek™ PCD-04 Particle Charge Detector. In this regard, the surface charges of colloids and solids in water lead to a concentration of oppositely charged ions, the so called counterions, at the particle surface. If these counterions are separated from or sheared off this particle, a streaming current can be measured in mV. A streaming current of zero mV denotes the zero point of charge where all existing charges in a sample are neutralized. In measuring the colloidal surface charge with the Mütek™ PCD-04, colloidally dissolved substances will adsorb at the cell wall as well as at the piston. The counterions remain comparatively free. A defined narrow gap is provided between cell wall and piston. Driven by a motor, the piston oscillates in the measuring cell and creates an intensive liquid flow. This entrains the free counterions and separates them from the adsorbed sample material. At the built-in electrodes, the counterions induce a current which is rectified and amplified electronically. A streaming potential with the appropriate sign is shown on the display. A person of skill could also determine that the second pH is low enough to be effective by measuring Zeta potential, for example.

The acidic pH can be controlled to provide a sufficient positive surface charge, as described above, but it should not be so low that the precipitated compound redissolves or crystallizes. The acidic pH can be controlled in some aspects to a level that induces a measured positive colloidal surface charge of the precipitate while maintaining at least 80 wt. % of the metal treatment agent as a precipitate, or at least 90 wt. %, or at least 95 wt. %, or at least 99 wt. % of the metal treatment can be maintained as a precipitate.

In embodiments, the timing of setting the first pH and second pH of the treatment composition solution can be controlled so that the second pH is reached within 72 hours of setting the first pH of the treatment composition, and preferably within 24 hours, 12 hours, 4 hours, 2 hours, and 1 hour. It has been discovered that the treatment composition may be more effective at removing the target anion if, once the first pH of the treatment composition solution is set, (either by preparing the solution at that pH or adjusting the pH), the pH of the solution is controlled to reach the second pH within these designated time periods.

The metal treatment agent includes at least one metal atom that can form the positively charged particles in the slurry that associate with and bind by electrostatic forces the anion and facilitate precipitation of the anion out of the water. The metal treatment agent can include one or more of a metal salt (e.g., metal halides, metal arsenates, and metal molybdates), metal hydroxide, and metal oxide. Specific examples include salts of iron, sodium, tin, cobalt, copper, aluminum, lanthanum, or zinc such as ferrous chloride, ferric chloride, stannous chloride, and stannic chloride. The metal treatment agent can include those that can be processed as described above to produce a positively charged precipitate that is a useful anion adsorbent material. In particular, in one aspect, if the process liquids are exposed to air, the metal treatment agent may be at least one that is thermodynamically stable in contact with air to prevent undesirable side reactions, e.g., salts of $Fe^{+3}$, $Sn^{+4}$, $Al^{+3}$, and $Ti^{+4}$ (in contrast, salts of $Fe^{+2}$ and $Sn^{+2}$ may not be suitable for such applications since they are not stable in contact with air). In another aspect, the metal treatment agent can be a soluble salt of a multivalent cation (i.e., a metal ion with positive charge of +2 or greater neglecting possible hydrolysis in solution), including those that precipitate to the extent of at least 95 wt. % at pH 12. Metal treatment agents that can precipitate as hydroxides may be preferred, in particular compounds of ferrous ($Fe^{+2}$) iron, stannous ($Sn^{+2}$) tin, and ferric ($Fe^{+3}$) iron, in particular salts of these metal ions such as ferric chloride.

In some aspects, the metal treatment agent is selected so that it does not reduce the oxidation state of the target anion, i.e., it does not act as a reducing agent or substantially does not act as a reducing agent (i.e., less than 5 wt. % of the target anion is reduced by the metal treatment agent, or preferably less than 1 wt. % of the target anion is reduced). Non-reducing metal treatment agents include ferric salts (e.g., ferric chloride, ferric sulfate), aluminum salts (e.g., aluminum chloride), and stannic salts (e.g., stannic chloride).

In other aspects, the treatment process can be controlled so that the anion is not reduced by the metal treatment agent or is at least substantially not reduced (i.e., less than 5 wt. % of the target anion is reduced by the metal treatment agent or preferably less than 1 wt. % of the target anion is reduced by the metal treatment agent). For example, although ferrous iron compounds would normally act as a reducing agent, e.g., to reduce selenate to selenite, the treatment process can be controlled so that the ferrous is converted to ferric by raising the pH before the ferrous is in contact with the target anion or before the ferrous is able to reduce the target anion in any substantial amount. The ferric compound that exists at the higher pH does not act as a reducing agent. In some aspects, during the treatment process at least 95 wt. % of the target anion does not change its oxidation state at least through the stage where the target anion is adsorbed on the positively charged precipitate and the precipitate is separated from the remainder of the solution.

The metal treatment agent can be added to a fluid and suspended or dissolved therein to provide a treatment composition solution. The treatment composition solution can include an amount of the metal treatment agent in a range of from 5 wt. % to 80 wt. %, from 10 wt. % to 50 wt. %, or from 25 wt. % to 45 wt. %. The treatment composition solution preferably includes primarily water.

The target-anion containing water can be any aqueous composition that includes primarily water, and can include any aqueous solution that originates and/or is derived from a natural and/or industrial source. Water sources may include aqueous streams, drinking waters, potable waters, recreational waters, waters derived from manufacturing processes, wastewaters, pool waters, spa waters, cooling waters, boiler waters, process waters, municipal waters, sewage waters, agricultural waters, ground waters, power plant waters, mine waters, remediation waters, co-mingled water, and combinations thereof.

The methods of the present invention can be used to remove any unwanted target anion from the water. The treatment methods may be effective to remove anions selected from the group consisting of a phosphate, an arsenate, a chromate, a molybdate, a fluoride, a perchlorate, a phosphorus-containing anion, an arsenic-containing anion, a fluorine-containing anion, a thallium-containing anion, a mercury-containing anion, a zinc-containing anion, a copper-containing anion, a chromium-containing anion, and a selenium-containing anion.

The methods described herein can be particularly effective to remove multivalent anions (i.e., ions with a negative charge of −2, −3, etc.) from water, in particular selenate ions. In aqueous environments or water, dissolved inorganic Se is normally present as (+6 oxidation state) selenate ($SeO_4^{-2}$) and as (+4 oxidation state) selenite ($SeO_3^{-2}$). The soluble inorganic Se forms, selenite and selenate, account for the majority of the total Se concentration found in natural, agricultural, or discharged waters and other aqueous solutions. The proportion of selenate/selenite present in waters is generally governed by the pH-redox status of the system. Selenate is stable under alkaline and oxidizing conditions and selenite is stable under mildly oxidizing conditions. The ratio of selenate to selenite present in natural waters is also affected by the different adsorption kinetics of selenate versus selenite.

Before being treated, the water may include the target anion in amounts of from 10 ppb to 1,000 ppm of the anion, from 15 ppb to 100 ppm, from 50 ppb to 10 ppm, and from 100 ppb to 1000 ppb. The metal treatment agent can be added in amounts sufficient to remove the target anion to desired levels, and may be added at a weight ratio relative to the target anion that is in a range of from 1:1 to 10,000:1, from 10:1 to 1,000:1, from 50:1 to 1,000:1, and from 100:1 to 500:1. The treatment may be effective to remove at least 75% of the target anion, and preferably at least 85%, at least 95%, and at least 99% of the target anion. The methods are surprisingly effective at reducing the amount of selenate in water to extremely low levels. For example, the treatment can be effective to reduce the amount of selenate in water to less than 100 ppb, less than 25 ppb, less than 15 ppb, less than 10 ppb, or less than 5 ppb.

In embodiments, the methods described herein can further include a step of removing, isolating, or precipitating ions that may interfere with the interaction or association between the target anion and the metal treatment agent. For example, where selenate is the target anion, the presence of sulfate ions appear to negatively affect the removal efficiency. In this regard, sulfate has the same charge and nearly the same size as selenate and is believed to interfere with the removal of selenate. Accordingly, to eliminate or at least greatly reduce interference by sulfate, an additive that interacts more preferentially with sulfate can also be added to the water if the concentration of sulfate is above a threshold level, such as a soluble barium salt like barium chloride. The barium chloride will interact with the sulfate ions to form barium sulfate ($BaSO_4$), which is less soluble, and therefore removes interfering sulfate ions from the water.

After treatment, the precipitate can be concentrated by known techniques such as sedimentation or centrifuging, and the precipitate can be separated from the solution.

EXAMPLES

Comparative Example 1: This example analyzes the removal of selenate using ferric chloride at one target pH. Stock solutions of water for testing were prepared by adding 10.5 mg of sodium selenate to 4 L of reverse osmosis (RO) water and mixing thoroughly. A solution of 40% ferric chloride in water was used as the treatment composition. 500 ppm of this ferric chloride solution was added to a stock solution containing 1100 ppb of selenium, via a micro pipette and mixed thoroughly. The pH of the solution was then adjusted to either an alkaline target pH using NaOH or an acidic target pH using HCl. After stirring for 10 min, the solution was gravity filtered followed by filtration using 0.45-micron syringe filter and filtrate was analyzed for selenium using ICP.

| pH | Se (ppb) | % Removal |
| --- | --- | --- |
| 11.20 | 1100 | 0.00% |
| 10.10 | 1100 | 0.00% |
| 9.00 | 1100 | 0.00% |
| 7.99 | 1000 | 9.09% |
| 7.20 | 900 | 18.18% |
| 5.98 | 70 | 93.64% |

-continued

| pH | Se (ppb) | % Removal |
|---|---|---|
| 5.10 | 630 | 42.73% |
| 4.00 | 1000 | 9.09% |

Comparative Example 2: This example analyzes the removal of selenate using different dosages of ferric chloride at a target pH of 4.00, 5.00 or 6.00. Stock solutions of water for testing were prepared by adding 14.0 mg of sodium selenate to 4 L of RO water and mixing thoroughly. A solution of 40% ferric chloride in water was used as the treatment composition. Varying amounts of ferric chloride were added to a solution containing 1467 ppb of selenium, via a micro pipette and mixed thoroughly. The pH of the solution was then adjusted to either an alkaline target pH using NaOH or an acidic target pH using HCl. After stirring for 10 min, the solution was gravity filtered followed by filtration using 0.45-micron syringe filter and filtrate was analyzed for selenium using ICP.

| Target pH = 4.00 | | |
|---|---|---|
| FeCl3 (40%) (ppm) | Se (ppb) | % Removal |
| 0 | 1467 | 0.00% |
| 100 | 1223 | 16.63% |
| 300 | 1359 | 7.36% |
| 500 | 1383 | 5.73% |
| 750 | 1298 | 11.52% |
| 1000 | 1306 | 10.97% |

| Target pH = 5.00 | | |
|---|---|---|
| FeCl3 (40%) (ppm) | Se (ppb) | % Removal |
| 0 | 1401 | 0.00% |
| 100 | 598.7 | 57.27% |
| 300 | 199.9 | 85.73% |
| 500 | 162.6 | 88.39% |
| 750 | 228.5 | 83.69% |

| Target pH = 6.00 | | |
|---|---|---|
| FeCl3 (40%) (ppm) | Se (ppb) | % Removal |
| 0 | 1421 | 0.00% |
| 100 | 1100 | 22.59% |
| 300 | 1054 | 25.83% |
| 500 | 703.5 | 50.49% |
| 750 | 1215 | 14.50% |

Comparative Example 3: This example analyzes the removal of selenate using different dosages of ferrous chloride at a target pH of 4.00. Stock solutions of water for testing were prepared by adding 8.0 mg of sodium selenate to 4 L of RO water and mixing thoroughly. A solution of 30% ferrous chloride in water was used as the treatment composition. Varying amounts of ferrous chloride were added to a solution containing 839 ppb of selenium, via a micro pipette and mixed thoroughly. The pH of the solution was then adjusted to an acidic target pH using HCl. After stirring for 10 min, the solution was gravity filtered followed by filtration using 0.45-micron syringe filter and filtrate was analyzed for selenium using ICP.

| FeCl2 (30%) ppm | Se (ppb) | % Removal |
|---|---|---|
| 0 | 839.61 | 0.00% |
| 300 | 839.61 | 0.00% |
| 500 | 684.94 | 18.42% |

Example 4: This example analyzes the removal of selenate using 500 ppm of 40% ferric chloride at an initial target pH of 9.20 and then adjusting the pH to a second target pH of 3.00-6.00. Stock solutions of water for testing were prepared by adding 8.0 mg of sodium selenate and 4 g of sodium borate to 4 L of RO water and mixing thoroughly. A solution of 40% ferric chloride in water was used as the treatment composition. 500 ppm of ferric chloride was added to a stock solution containing 839 ppb of selenium, via a micro pipette and mixed thoroughly. After stirring the solution of sodium selenate and sodium borate for 10 min, the solution was adjusted to pH 3, 4, 5, or 6 using HCl and stirred for an additional 10 min, the solution was gravity filtered followed by filtration using 0.45-micron syringe filter and filtrate was analyzed for selenium using ICP.

| 500 ppm FeCl3 (40%) RO 1000 ppm Borax | | |
|---|---|---|
| $2^{nd}$ pH | Se (ppb) | % Removal |
| 3 | 311.54 | 62.89474 |
| 4 | 16.57 | 98.02632 |
| 5 | 88.38 | 89.47368 |
| 6 | 637.99 | 24.01316 |

Example 5: This example analyzes the removal of selenate using 500 ppm of 40% ferric chloride at a first target pH in the range of 3.3-9.20, and then adjusting the pH to a second target pH of 4. Stock solutions of water for testing were prepared by adding 8.0 mg of sodium selenate to 4 L of RO water and mixing thoroughly. A solution of 40% ferric chloride in water was used as the treatment composition. 500 ppm of the ferric chloride solution was added to a stock solution containing 839 ppb of selenium, via a micro pipette and mixed thoroughly. Varying amounts of sodium borate were added to acquire first target pH. After stirring for 10 min the solution was adjusted to a second target pH of 4 using HCl and stirred for an additional 10 min, the solution was gravity filtered followed by filtration using 0.45-micron syringe filter and filtrate was analyzed for selenium using ICP.

| 500 ppm FeCl3 (40%) | | |
|---|---|---|
| First target pH | Se (ppb) | % Removal |
| 3.3 | 657.32 | 21.71052632 |
| 8.3 | 287.23 | 65.78947368 |
| 8.4 | 139.75 | 83.35526316 |
| 8.6 | 2.76 | 99.67105263 |
| 8.7 | 5.52 | 99.34210526 |
| 8.9 | 16.57 | 98.02631579 |
| 9.25 | 939 | 98.88157895 |
| 9.23 | 38.67 | 95.39473684 |

Example 6: This example analyzes the removal of selenate using varying amounts of 40% ferric chloride at an initial target pH of 9.00 and then adjusting the pH to a second target pH to 4.00. Stock solutions of water for testing were prepared by adding 10.1 mg of sodium selenate and 4 g of sodium borate to 4 L of RO water and mixing thoroughly. A solution of 40% ferric chloride in water was used as the treatment composition. Varying amounts of the ferric chloride solution were added to a solution containing 1052 ppb of selenium, via a micro pipette and mixed thoroughly. After stirring for 10 min at pH 9.0, the solution was adjusted to pH 4 using HCl and stirred for an additional 10 min, the solution was gravity filtered followed by filtration using 0.45-micron syringe filter and filtrate was analyzed for selenium using ICP.

| FeCl3 (40%) (ppm) | Se (ppb) | % Removal |
|---|---|---|
| 100 | 175.15 | 83.35076 |
| 300 | 35.6 | 96.61597 |
| 500 | 22.9 | 97.82319 |
| 750 | 14.8 | 98.59316 |
| 1000 | 11.6 | 98.89734 |

Example 7: This example analyzes the removal of selenate using varying amounts of 30% ferrous chloride at an initial target pH of 9.00 and then adjusting the pH to a second target pH to 4.00. Stock solutions of water for testing were prepared by adding 8.1 mg of sodium selenate and 4 g of sodium borate to 4 L of RO water and mixing thoroughly. A solution of 30% ferrous chloride in water was used as the treatment composition. Varying amounts of ferrous chloride were added to a solution containing 850.65 ppb of selenium, via a micro pipette and mixed thoroughly. After stirring for 10 min at pH 9.0, the solution was adjusted to pH 4.0 using HCl and stirred for an additional 10 min, the solution was gravity filtered followed by filtration using 0.45-micron syringe filter and filtrate was analyzed for selenium using ICP.

| FeCl2 (30%) ppm | Se (ppb) | % Removal |
|---|---|---|
| 0 | 850.65 | 0.00% |
| 300 | 27.62 | 96.75% |
| 500 | 22.09 | 97.40% |
| 750 | 49.71 | 94.16% |
| 1000 | 138.09 | 83.77% |

Example 8: This example analyzes the removal of selenate using 40% ferric chloride at an initial target pH of 9.00 and then adjusting the pH to a second target pH to 4.00. Stock solutions of water for testing were prepared by adding 10.1 mg of sodium selenate to 4 L of RO water and mixing thoroughly. A solution of 40% ferric chloride in water was used as the treatment composition. Varying amounts of ferric chloride were added to a solution containing 1052 ppb of selenium, via a micro pipette and mixed thoroughly. The pH of the solution was then adjusted to an alkaline target pH of 9 using NaOH. After stirring for 10 min, the solution was adjusted to pH 4 using HCl and stirred for an additional 10 min, the solution was gravity filtered followed by filtration using 0.45-micron syringe filter and filtrate was analyzed for selenium using ICP.

| FeCl3 (40%) ppm | Se (ppb) | % Removal |
|---|---|---|
| 100 | 143.2 | 86.04% |
| 300 | 29.3 | 97.14% |
| 500 | 15.4 | 98.50% |
| 750 | 13.2 | 98.71% |
| 1000 | 14.2 | 98.62% |

Example 9: This example analyzes the removal of selenate using 30% ferrous chloride at an initial target pH of 9.00 and then adjusting the pH to a second target pH to 4.00. Stock solutions of water for testing were prepared by adding 10.1 mg of sodium selenate to 4 L of RO water and mixing thoroughly. A solution of 30% ferrous chloride in water was used as the treatment composition. Varying amounts of ferrous chloride were added to a solution containing 1052 ppb of selenium, via a micro pipette and mixed thoroughly. The pH of the solution was then adjusted to an alkaline target pH of 9 using NaOH. After stirring for 10 min, the solution was adjusted to pH 4 using HCl and stirred for an additional 10 min, the solution was gravity filtered followed by filtration using 0.45-micron syringe filter and filtrate was analyzed for selenium using ICP.

| FeCl3 (40%) ppm | Se (ppb) | % Removal |
|---|---|---|
| 100 | 104.9 | 90.02852 |
| 300 | 40 | 96.19772 |
| 500 | 39.9 | 96.20722 |

Example 10: This example analyzes the removal of selenate using 500 ppm of different inorganic aids following the procedure outlined in Example 7

| Treatment 500 ppm | Se (ppb) | % Removal |
|---|---|---|
| — | 839.61 | 0.00% |
| FeCl3 (40%) | 16.57 | 98.03% |
| FeCl2 (30%) | 22.09 | 97.37% |
| SnCl2 2H2O (50%) | 16.57 | 98.03% |
| BiCl3 (40%) | 894.84 | −6.58% |
| CeCl3 (40%) | 861.70 | −2.63% |
| Na2MoO4 (35%) | 861.70 | −2.63% |
| K2MnO4 (100%) | 839.61 | 0.00% |
| AlCl3*6H2O (28%) | 712.56 | 15.13% |

Example 11: These results show the removal efficiency of arsenic, molybdate and fluoride removal using 500 ppm 40% ferric chloride at high then low pH vs 500 ppm 40% ferric chloride at low pH. Stock solutions were made using Na2HAsO4.7H2O, Na2MoO4, NaF following the procedure outlined in Example 3 (pH 4) and Example 4 (first pH 9 and then pH 4).

| Na$_2$HAsO$_4$•7H$_2$O | As ppm |
|---|---|
| Stock solution | 1.54 |
| 500 ppm FeCl3 pH up 9 than down 4 | 0.00 |
| 500 ppm FeCl3 pH 4 | 1.51 |

| Na2MoO4 | Mo ppm |
|---|---|
| Stock solution | 1.27 |
| 500 ppm FeCl3 pH up | 0.00 |

-continued

| Na2MoO4 | Mo ppm |
|---|---|
| 9 than down 4 500 ppm FeCl3 pH 4 | 1.10 |

| NaF | F ppm |
|---|---|
| Stock solution | 0.94 |
| 500 ppm FeCl3 pH up 9 than down 4 | 0.40 |
| 500 ppm FeCl3 pH 4 | 0.86 |

Example 12: This example analyzes the leaching of selenium from the precipitated solids over time, following the procedure outlined in Example 8. After stirring for 10 min, the solution was adjusted to pH 4 using HCl and stirred for an additional 5 min, 30 min, 3 hours, 28 hours and the solution was gravity filtered followed by filtration using 0.45-micron syringe filter and filtrate was analyzed for selenium using ICP. As can be seen, the selenium content increases at 28 hours as compared to 3 hours.

| Time Release Study | |
|---|---|
| Time | Se ppb |
| 5 min | 90 |
| 30 min | 40 |
| 3 hours | 30 |
| 28 hours | 50 |

Example 13: This example analyzes the impact of solution ageing at high pH on effectiveness of selenate removal. Stock solutions of water for testing were prepared by adding 15.3 mg of sodium selenate to 4 L of RO water and mixing thoroughly. A solution of 40% ferric chloride in water was used as the treatment composition. 500 ppm of ferric chloride was added to a stock solution containing 1600 ppb of selenium, via a micro pipette and mixed thoroughly. The pH of the solution was then adjusted to an alkaline target pH of 9 using NaOH. After stirring for 10 min, 30 min, 2 hours, 4.5 hours and 24 hours the solution was adjusted to pH 4 using HCl and stirred for an additional 10 min, the solution was gravity filtered followed by filtration using 0.45-micron syringe filter and filtrate was analyzed for selenium using ICP.

| Mix time (h) | Se ppb | % Removal |
|---|---|---|
| 0.16 | 60 | 96.25 |
| 0.5 | 50 | 96.875 |
| 2 | 40 | 97.5 |
| 4.5 | 90 | 94.375 |
| 24 | 100 | 93.75 |

Example 14: This example analyzes the effect of using isolated Fe species to remove selenate. Fe species were isolated by adding 40% ferric chloride to RO water. Solution pH was adjusted to pH 9 using NaOH and mixed for 10 minutes. After 10 minutes of mixing, solution was centrifuged to separate formed Fe species from aqueous portion. Isolated Fe species were added at varying amounts to prepared stock solution of 1600 ppb selenium (see example 13). After stirring for 10 min, the solution was adjusted to pH 4 using HCl and stirred for an additional 10 min, the solution was gravity filtered followed by filtration using 0.45-micron syringe filter and filtrate was analyzed for selenium using ICP.

| Isolated Iron Species (ppm) | Se (ppb) | % Removal |
|---|---|---|
| 150 ppm | 390 | 75.62 |
| 300 ppm | 560 | 65 |
| 500 ppm | 280 | 82.5 |

This shows that it is possible to isolate and/or concentrate the precipitated iron, even without a preservative, at a high or low pH and then use it to remove a target anion from water. The use of a preservative may improve the results.

Example 15: This example analyzes FeCl2, FeCl3 and SnCl2 selenate removal efficacy with and without adjusting for a $1^{st}$ pH target following the procedure outlined in Example 3 (pH 4) and Example 4 (pH 9 and then pH 4).

| Additive | 1st Target pH | 2nd Target pH | % removal |
|---|---|---|---|
| FeCl2 (300 ppm) | — | 4 | 0.0% |
| FeCl2 (300 ppm) | 9 | 4 | 96.7% |
| FeCl2 (500 ppm) | — | 4 | 18.4% |
| FeCl2 (500 ppm) | 9 | 4 | 97.3% |
| FeCl3 (500 ppm) | — | 4 | 21.7% |
| FeCl3 (500 ppm) | 9 | 4 | 98.0% |
| SnCl2 (500 ppm) | — | 4 | 63.2% |
| SnCl2 (500 ppm) | 9 | 4 | 98.0% |

Example 16: This example analyzes the effect of added SO4− on SeO4 removal. These results were demonstrated following the procedure outlined in Example 8 at 500 ppm of 40% ferric chloride.

| Added SO4 ppm | Se (ppb) | % Removal |
|---|---|---|
| 0 | 62.40 | 94.53 |
| 10 | 85.90 | 92.46 |
| 100 | 881.00 | 22.72 |
| 500 | 1070.00 | 6.14 |
| 2000 | 1090.00 | 4.49 |

Example 17: This example shows the content of tap water containing 31 ppm of SO4. Stock solutions of water for testing were prepared by adding 12.4 mg of sodium selenate to 4 L of tap water and mixing thoroughly. The resulting solution had the water profile shown below.

| Analysis | STOCK 522 |
|---|---|
| pH | 7.11 |
| Conductivity, μmho | 205 |
| "M"-Alkalinity, as CaCO$_3$, mg/L | 57 |
| Calcium Hardness, as CaCO$_3$, mg/L | 52 |
| Magnesium Hardness, as CaCO$_3$, mg/L | 11 |
| Iron, as Fe, mg/L | <0.01 |
| Copper, as Cu, mg/L | 0.03 |
| Zinc, as Zn, mg/L | 0.05 |
| Sodium, as Na, mg/L | 15 |
| Potassium, as K, mg/L | 1.8 |
| Chloride, as Cl, mg/L | 17 |
| Sulfate, as SO$_4$, mg/L | 31 |

-continued

| Analysis | STOCK 522 |
|---|---|
| Nitrate, as $NO_3$, mg/L | 1.2 |
| Ortho-Phosphate, as $PO_4$, mg/L | 1.4 |
| Silica, as $SiO_2$, mg/L | 5.7 |
| Selenium, as Se, mg/L | 1.3 |

Example 18: This example analyzes the removal of selenate from the tap water containing SO4 that has been conditioned with BaCl2 to precipitate the sulfate following the procedure outlined in Example 3 (pH 4) and Example 4 (pH 9 and then pH 4).

| | 30% ferrous chloride (ppm) | | | | |
|---|---|---|---|---|---|
| | 0 | 300 | 500 | 750 | 1000 |
| Tap + pH 4 | 1.51 | 1.64 | 1.64* | 1.58* | |
| Tap + Borax (pH 9) + pH 4 | 1.44 | 1.02 | 0.82 | 0.76 | 0.71 |
| Tap + BaCl2 + pH 4 | 1.17 | 0.42 | 1.18 | 0.75 | 0.8 |
| Tap + BaCl2 + Borax (pH 9) + pH4 | 1.34 | 0.15 | <0.001 | 0.025 | 0.034 |

| | 40% ferric chloride (ppm) | | | | |
|---|---|---|---|---|---|
| | 0 | 300 | 500 | 700 | 900 |
| Tap + pH 4 | 1.52 | 1.51 | 0.99 | 1.47 | 0.96 |
| Tap + Borax (pH 9) + pH 4 | 1.44 | | 0.55 | 0.14 | 0.31 |
| Tap + BaCl2 + pH 4 | 1.17 | 0.41 | 0.31 | 0.1 | 0.13 |
| Tap + BaCl2 + Borax (pH 9) + pH4 | 1.34 | 0.08 | 0.016 | 0.007 | 0.006 |

Example 19: This example shows removal of selenate from refinery wastewater in a field trial with and without a sulfate removal step. The refinery water analysis is shown below.

1. Untreated refinery water filtered using 0.45 filter
2. FeCl3 one pH adjustment going low to 4
3. pH up to 9 with Borax and then down to 4 without pretreatment for sulfate
4. FeCl3 one pH adjustment gong high to 8
5. Pretreatment for sulfate than pH up to 9 with Borax and then down to 4

| Refinery wastewater field trial | Se ppb |
|---|---|
| 1. Untreated filtered | 108.2 |
| 2. 500 ppm FeCl3 pH 4 | 27.7 |
| 3. Borax 1000 ppm 500 ppm FeCl3 + HCl pH 4 | 37.6 |
| 4. 500 ppm FeCl3 NaOH pH 8 | 69.7 |
| 5. 200 ppm Ba + Borax 1000 ppm 500 ppm FeCl3 + HCl pH 4 | 6.4 |

Example 20: This example shows removal of selenate from mining wastewater in a field trial with one pH adjustment and 2 pH adjustments. The mining water content is also provided below.

| Test Conditions | Se (ppb) |
|---|---|
| Untreated | 30.16 |
| FeCl3 (500 ppm) pH 3.2 | 5.2 |
| FeCl3 (500 ppm) pH 9, pH 4 | 2.9 |

Mining Water Content

| Analysis | Mining Water Analysis |
|---|---|
| pH | 3.9 |
| Conductivity, μmho | 452 |
| Calcium Hardness, as $CaCO_3$, mg/L | 44 |
| Magnesium Hardness, as $CaCO_3$, mg/L | 5.8 |
| Iron, as Fe, mg/L | 0.01 |
| Sodium, as Na, mg/L | 50 |
| Potassium, as K, mg/L | 0.85 |
| Chloride, as Cl, mg/L. | 5.6 |
| Sulfate, as $SO_4$, mg/L | 177 |
| Nitrate, as $NO_3$, mg/L | 3.6 |
| Silica, as $SiO_2$, mg/L | 45 |
| Selenium, as Se, mg/L | <0.05 |
| Total Suspended Solids, mg/L | 1.3 |
| Turbidity, as NTU | 1.59 |

Example 21: This example shows removal of selenate from coal ash pond water following a sulfate removal step with barium chloride. The coal ash pond water content is also provided below.

| Coal ash pond water field trial | Se (ppm) | SO4 (ppm) |
|---|---|---|
| Untreated | 120 | 1171 |
| Untreated Filtered | 50.4 | |
| 1300 ppm Ba mix 20 min filter 0.45 micron following treatments tested using filtrate with reduced SO4 | 35.6 | 14 |
| 500 ppm FeCl3 pH 3.3 | 21.4 | |
| 500 ppm FeCl3 + NaOH pH 9.0 | 30.3 | |
| 300 ppm FeCl3 + NaOH pH 9.0 + HCl pH 4 | 24.8 | |
| 500 ppm FeCl3 + NaOH pH 9.0 + HCl pH 4 | 13.7 | |
| 700 ppm FeCl3 + NaOH pH 9.0 + HCl pH 4 | 7.7 | |
| 900 pp FeCl3 + NaOH pH 9.0 + HCl pH 4 | 4.2 | |

Coal Ash Pond Water Content

| | |
|---|---|
| pH | 8.20 |
| Conductivity, μmho | 2500 |
| "M"-Alkalinity, as $CaCO_3$, mg/L | 100 |
| Calcium Hardness, as $CaCO_3$, mg/L | 954 |
| Magnesium Hardness, as $CaCO_3$, mg/L | 154 |
| Sodium, as Na, mg/L | 127 |
| Potassium, as K, mg/L | 23 |
| Chloride, as Cl, mg/L | 128 |
| Sulfate, as $SO_4$, mg/L | 1092 |
| Nitrate, as $NO_3$, mg/L | 11 |
| Silica, as $SiO_2$, mg/L | 3.6 |
| Boron, as B, mg/L | 6.6 |

| | |
|---|---|
| Strontium, as Sr, mg/L | 3.2 |
| Total Selenium, as Se, mg/L | 0.11 |
| Total Suspended Solids, mg/L | 6.8 |
| Turbidity, as NTU | 6.17 |

The invention claimed is:

1. A method of treating water that contains a target anion, the method comprising:
 providing a treatment composition solution containing a metal treatment agent;
 increasing the pH of the treatment composition solution with a pH adjusting agent to a first pH that is greater than 8.3, and then decreasing the pH of the treatment composition solution to a second pH that is less than 4.5; and
 contacting the treatment composition solution with the water that contains the target anion such that the target anion precipitates.

2. The method of claim 1, wherein the metal treatment agent includes at least one selected from the group consisting of ferric salt, ferrous salt, stannous salt, and aluminum salt.

3. The method of claim 1, wherein the treatment composition solution is contacted with the water that includes the target anion after the treatment composition solution is set to the first pH, and before the pH of the treatment composition solution is adjusted to the second pH.

4. The method of claim 1, wherein the treatment composition solution is contacted with the water that includes the target anion after the pH of the treatment composition solution is adjusted to the second pH.

5. The method of claim 1, wherein the treatment composition solution is contacted with the water that includes the target anion before the treatment composition solution is set to the first pH.

6. The method of claim 1, wherein the step of adjusting the pH of the treatment composition solution to the second pH occurs within 72 hours of the step of setting the pH of the treatment composition solution to the first pH.

7. The method of claim 1, wherein the first pH is in a range of from 8.5 to 10, and the second pH is in a range of from 2 to less than 4.5.

8. The method of claim 1, wherein the target anion is at least one selected from the group consisting of a chromate, a molybdate, a thallium-containing anion, a mercury-containing anion, a zinc-containing anion, a copper-containing anion, and a selenium-containing anion.

9. The method of claim 1, wherein the step of increasing the pH of the treatment composition solution includes adding the pH adjusting agent to the treatment composition solution.

10. A method of treating water that contains selenate, the method comprising:
 providing a treatment composition solution containing a metal treatment agent;
 increasing the pH of the treatment composition solution with a pH adjusting agent to a first pH that is in a range of from 8.3 to 10, and then decreasing the pH of the treatment composition solution to a second pH that is in a range of from 2 to 6; and
 contacting the treatment composition solution with the water that contains selenate, and wherein the metal treatment agent reduces less than 5 wt. % of the selenate.

11. The method of claim 10, wherein the method is effective to remove at least 85% of the selenate contained in the water.

12. The method of claim 10, wherein the water includes at least 50 ppb selenate before it is treated.

13. The method of claim 10, wherein the water includes less than 25 ppb selenate after it is treated.

14. The method of claim 10, further comprising a step of precipitating, removing, or isolating sulfate ions that are present in the water.

15. The method of claim 10, wherein the metal treatment agent includes at least one of ferric salt, aluminum salt, and stannic salt.

16. The method of claim 10, wherein the metal treatment agent includes a ferric salt.

17. The method of claim 10, wherein the metal treatment agent that is contacted with the water is provided in a weight ratio, relative to the amount of selenate, that is in a range of from 100:1 to 1,000:1.

18. A method of treating water that contains a multivalent target anion, the method comprising:
 providing a treatment composition solution containing a metal treatment agent that is a soluble salt of a multivalent cation;
 increasing the pH of the treatment composition solution with a pH adjusting agent so that the pH is in the range of 8.3 to 10 and causing at least 80 wt. % of the metal treatment agent to precipitate, and then controlling the pH of the treatment composition solution so that the pH is acidic and so that the precipitated metal treatment agent becomes sufficiently positively charged that the treatment composition solution exhibits a positive measured colloidal surface charge as measured by a Mütek™ PCD-04 Particle Charge Detector, and so that at least 80 wt. % of the metal treatment agent is maintained as a precipitate; and
 contacting the treatment composition solution with the water that contains the multivalent target anion, and wherein the multivalent target anion adsorbs onto the positively charged precipitated metal treatment agent.

19. The method of claim 18, wherein the pH of the treatment composition solution is controlled at the alkaline pH so that at least 95 wt. % of the metal treatment agent precipitates.

20. The method of claim 18, wherein the pH of the treatment composition solution is controlled at the acidic pH so that at least 95 wt. % of the metal treatment agent is maintained as the precipitate.

21. The method of claim 18, wherein the treatment composition solution is contacted with the water that contains the multivalent target anion (i) after the metal treatment agent precipitates, and before the precipitated metal treatment agent becomes sufficiently positively charged that the treatment composition solution exhibits the positive measured colloidal surface charge; (ii) after the precipitated metal treatment agent becomes sufficiently positively charged that the treatment composition solution exhibits the positive measured colloidal surface charge; or (iii) before the metal treatment agent precipitates.

\* \* \* \* \*